Oct. 21, 1947.  E. T. WARD  2,429,537
METHOD AND APPARATUS FOR PRODUCING BANDED CORD LENGTHS
Filed Oct. 18, 1944  7 Sheets-Sheet 5
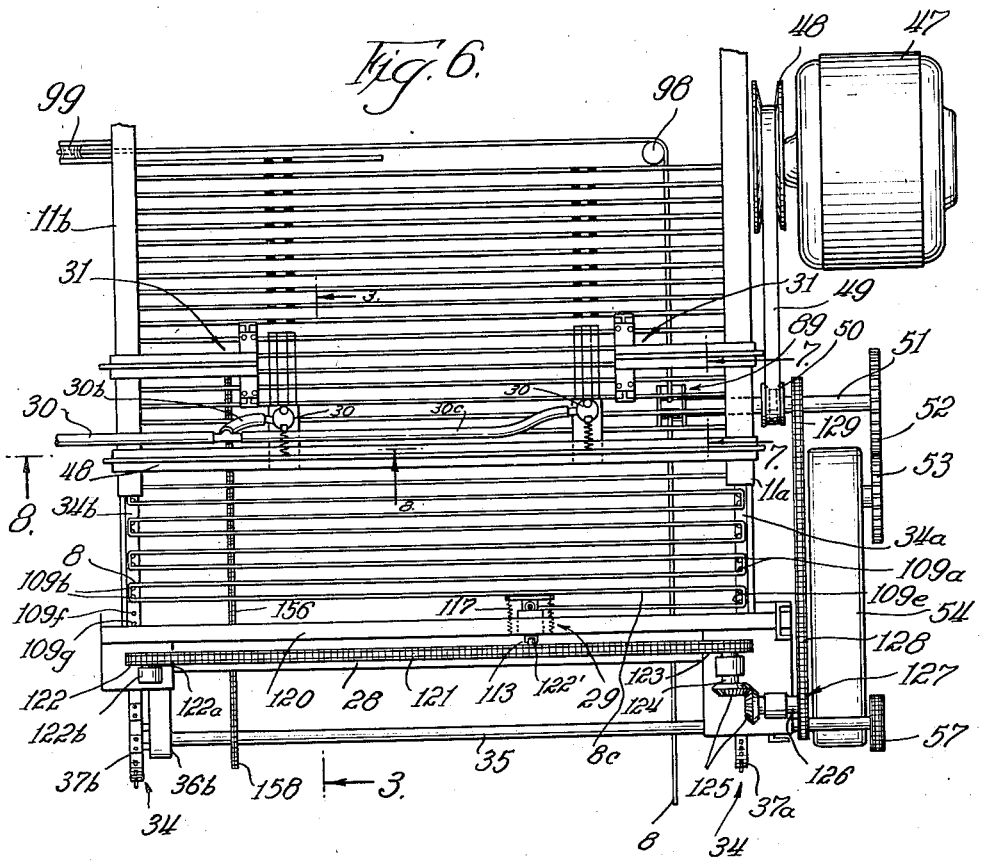
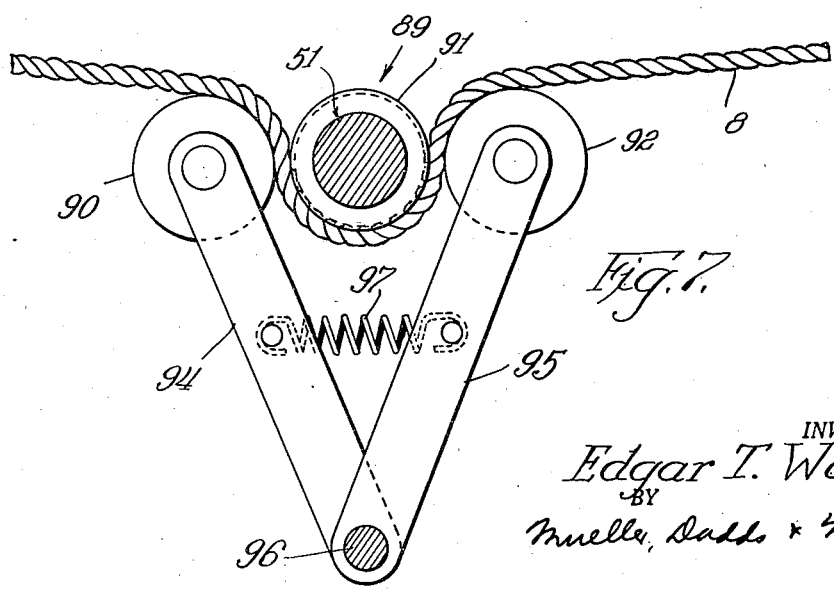
INVENTOR.
Edgar T. Ward
BY
Mueller, Dadds & Mason
Att'ys.

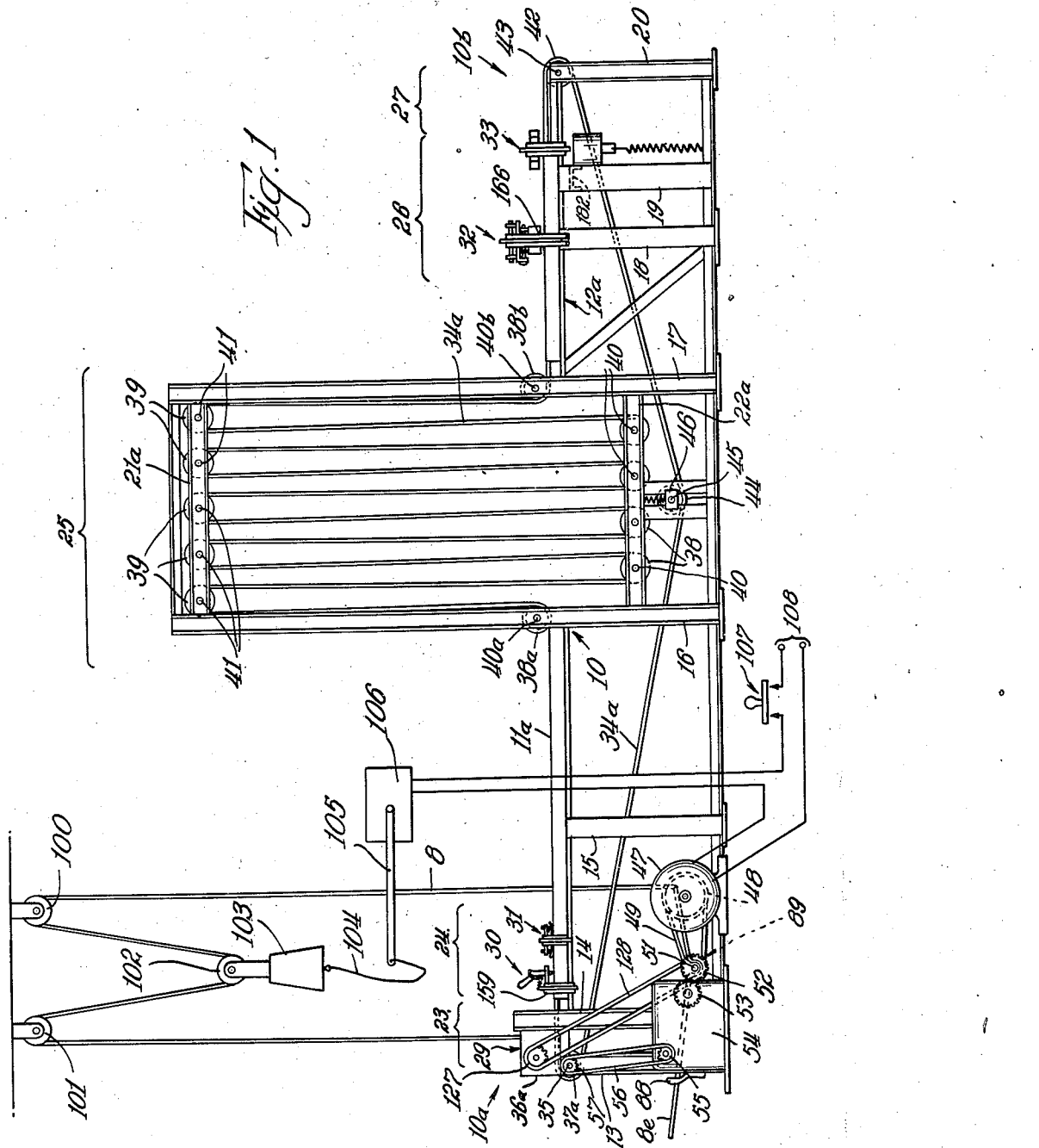

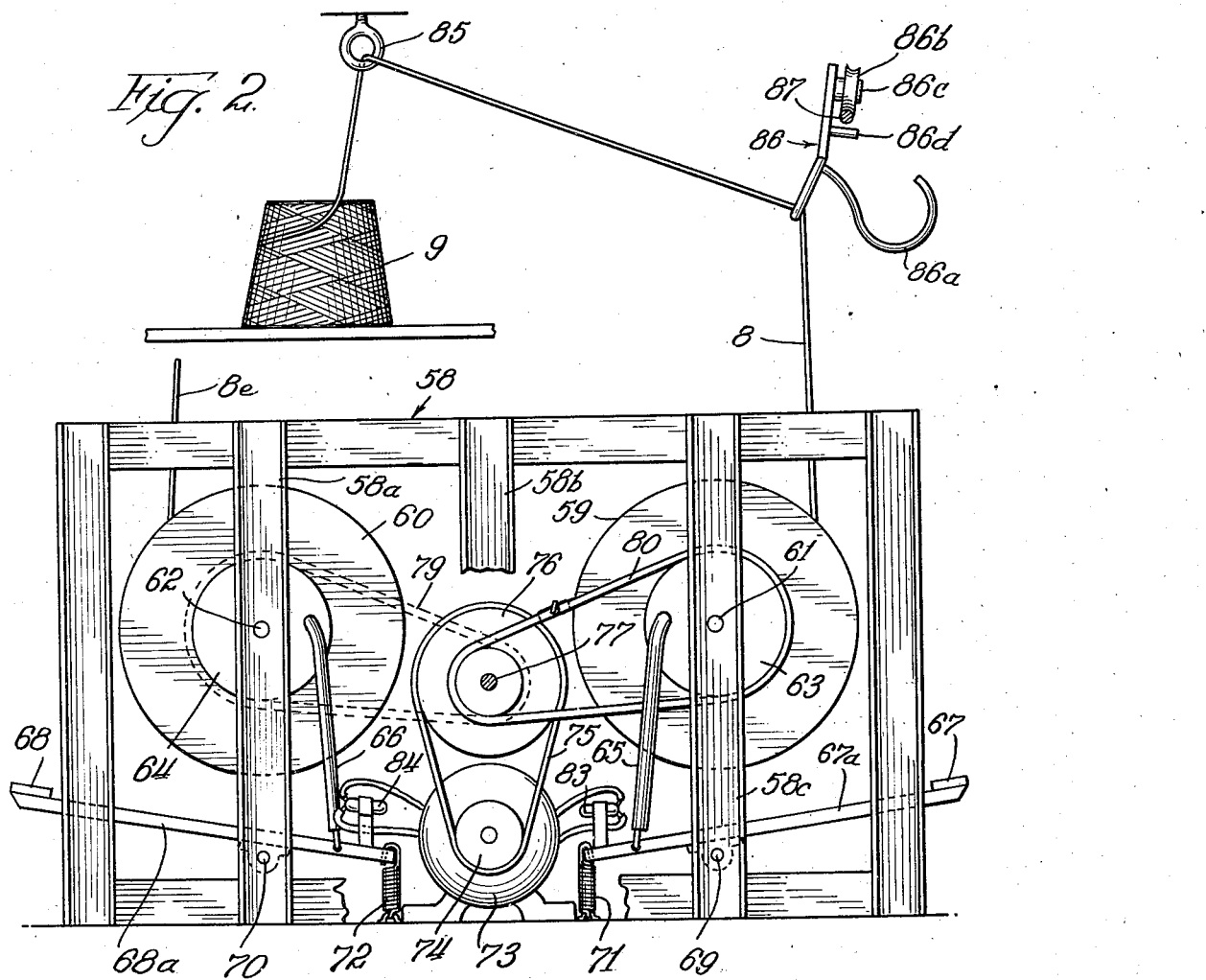

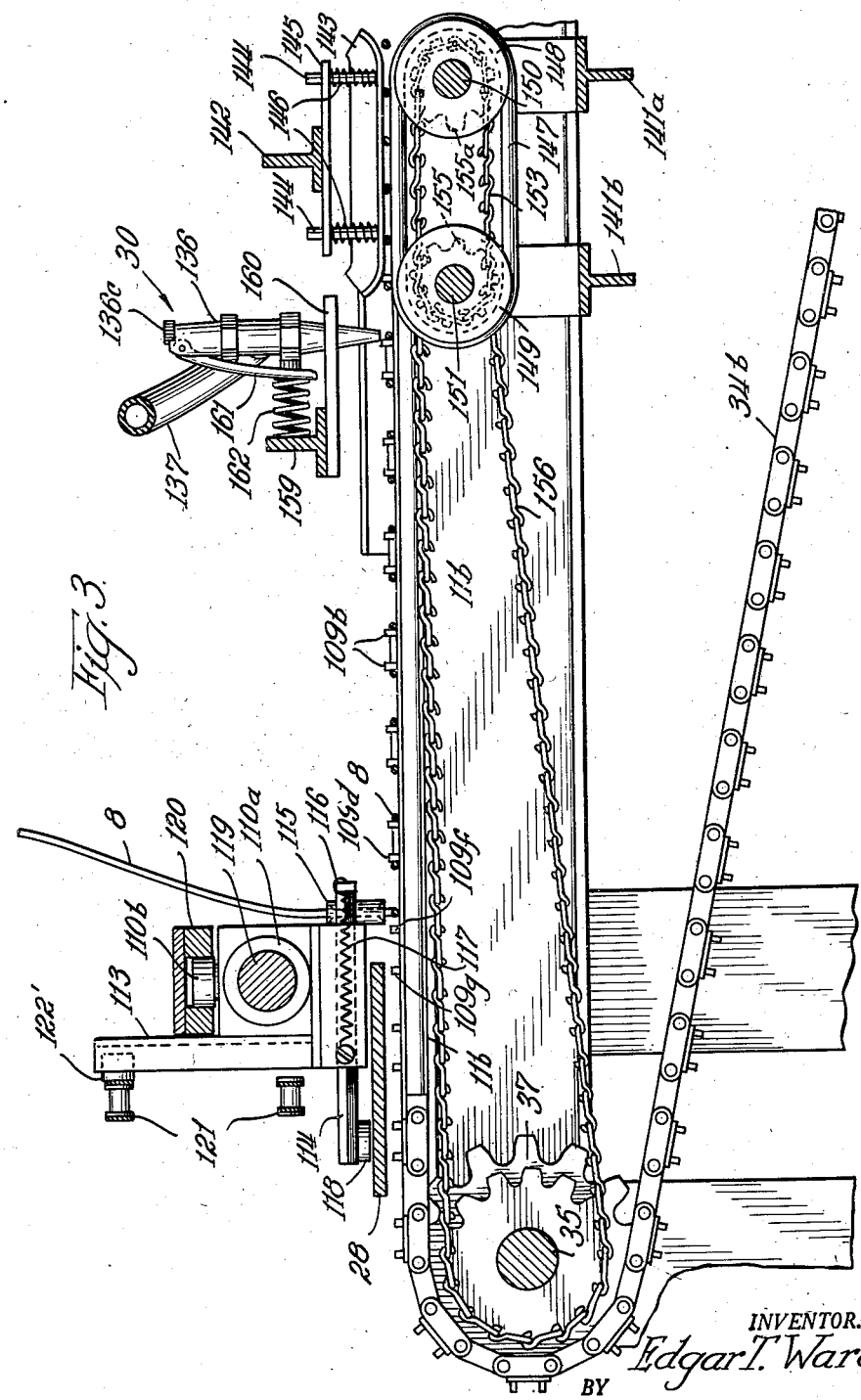

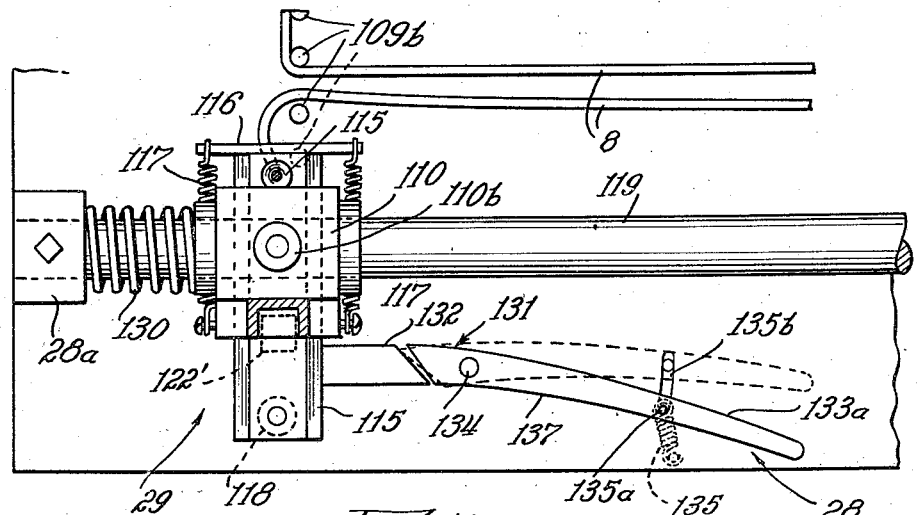
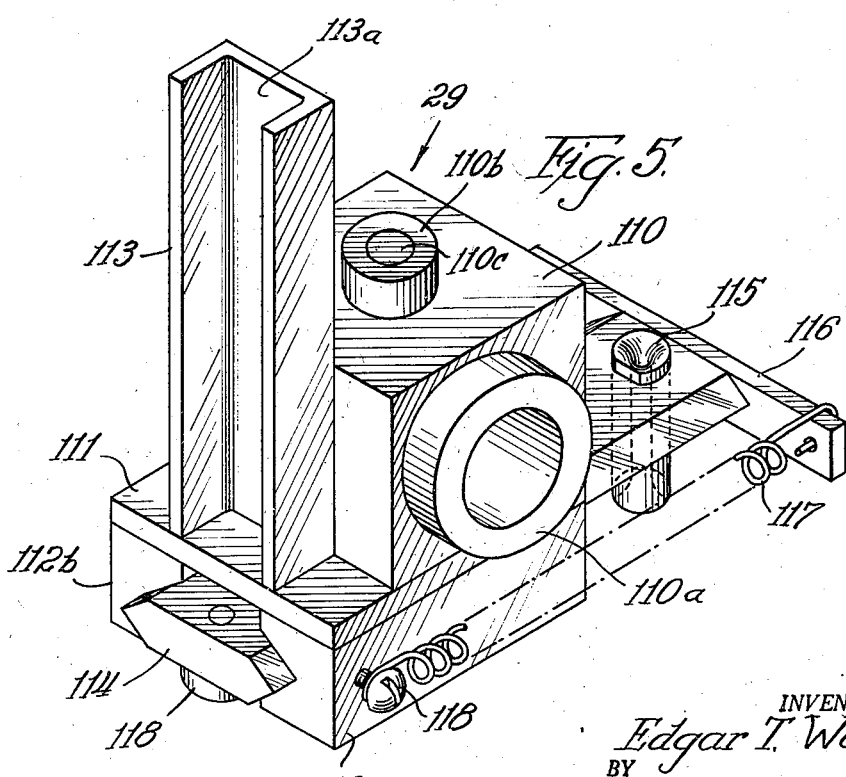

Oct. 21, 1947.  E. T. WARD  2,429,537
METHOD AND APPARATUS FOR PRODUCING BANDED CORD LENGTHS
Filed Oct. 18, 1944  7 Sheets-Sheet 6
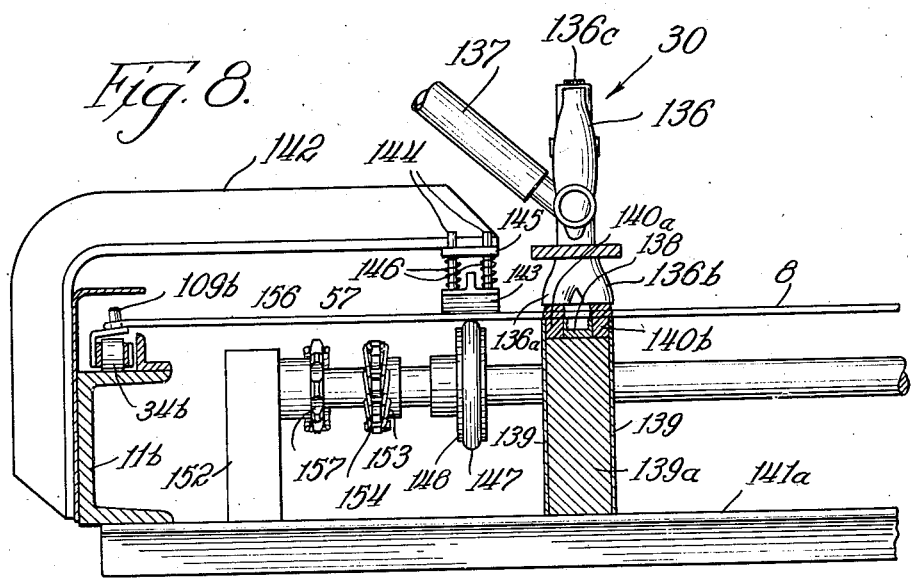
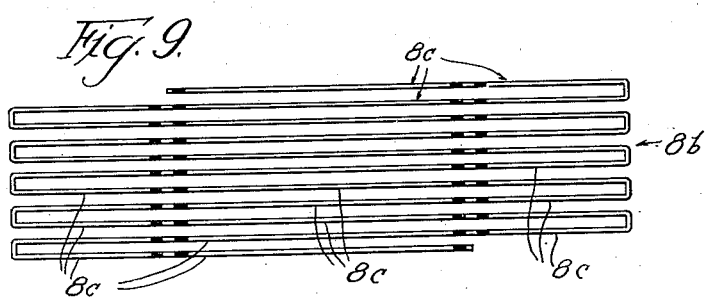
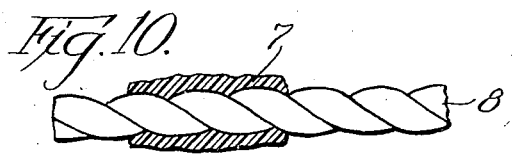
INVENTOR.
Edgar T. Ward
BY
Mueller, Dadds & Mason
Attys.

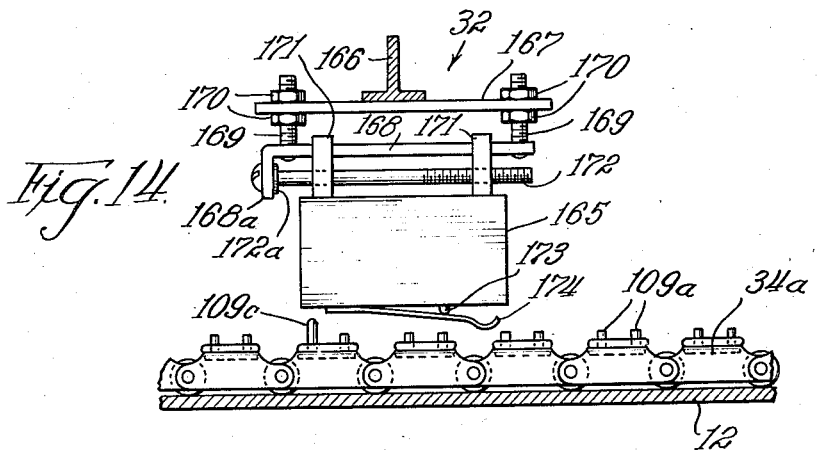
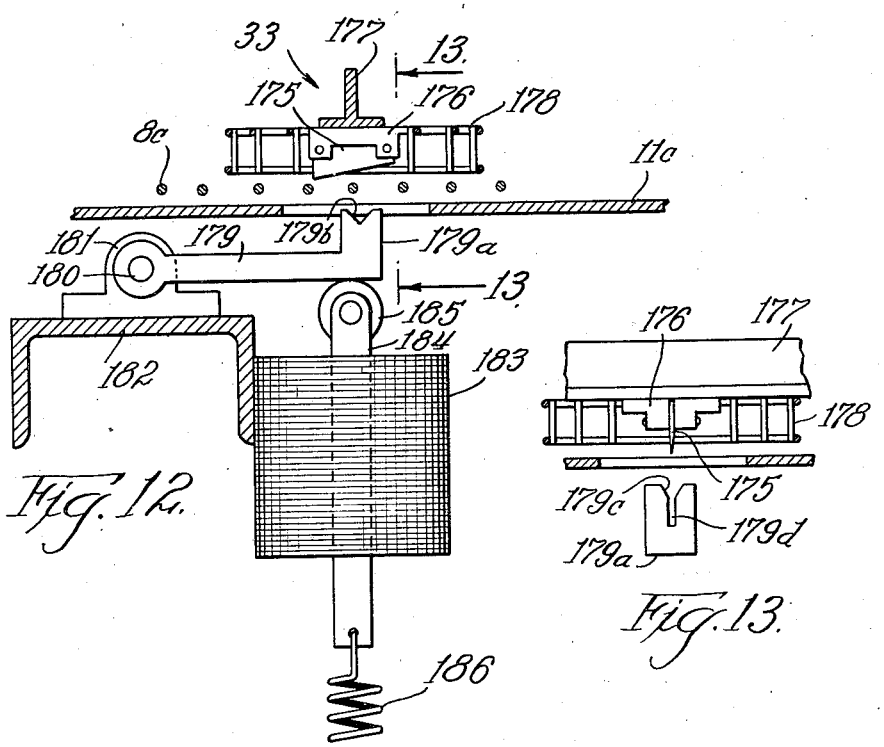

Patented Oct. 21, 1947

2,429,537

UNITED STATES PATENT OFFICE 2,429,537

METHOD AND APPARATUS FOR PRODUCING BANDED CORD LENGTHS

Edgar T. Ward, Oak Park, Ill.

Application October 18, 1944, Serial No. 559,216

15 Claims. (Cl. 117—43)

The present invention relates to methods and apparatus for producing bands on cord lengths, and more particularly to improved methods and apparatus for applying ravel preventing bands to twine, lacing, braid and the like, and to the improved article resulting from use of the methods and apparatus. Throughout the specification and claims the term "cord" is used in a generic sense to designate any elongated flexible material of the character used for tying purposes.

Various methods and apparatus are available for applying metal or plastic bands to a continuous cord at spaced intervals therealong. Regardless of the band material used, however, die forming operations are relied upon to affix the band material to the cord. Usually the cord is fed as a single length continuously in one direction through a band-forming die assembly and is momentarily stopped to permit the band-forming operation of the die assembly each time the cord is moved within the assembly to a position where a band is desired. This procedure also involves cutting of the band or plastic stock into segments of suitable size to form bands of the desired width. As a result conventional band-forming methods and apparatus are slow and costly.

It is an object of the present invention, therefore, to provide improved methods and apparatus for producing bands on cord lengths at high speed and with low cost.

According to another object of the invention, the bands are produced upon the cord stock in groups without in any way interrupting movement of the cord stock.

It is another object of the invention to provide improved and relatively simple apparatus for automatically, rapidly and reliably producing bands at predetermined points along a continuous cord, for hanking the cord, and for cutting the hanked and banded cord into predetermined lengths.

It is a further object of the invention to provide improved and exceedingly simple apparatus for continuously feeding the stock cord to the band-forming, hanking and cutting apparatus.

It is a still further object of the invention to provide as an article of manufacture an improved non-metallic cord band which may be easily and cheaply manufactured, and is non-inflammable and impervious to moisture.

In brief, the above objects are attained in accordance with the present invention by bunching the continuous cord into cord sections of substantially the same length while maintaining the cord sections separated, moving the cord sections through a coating zone, and feeding a liquid band-forming material to predetermined segments of the cord sections as they are moved through the coating zone. After the band segments are thus formed on the cord sections, these sections are moved through a drying zone to a cord cutting zone where the bunched and banded cord stock is automatically cut into the desired lengths.

The invention, both as to its organization and method of operation, together with further objects and advantages thereof, will best be understood by reference to the following specification taken in connection with the accompanying drawings, in which:

Fig. 1 is a side view in elevation of improved apparatus characterized by the features of the present invention and capable of use in practicing the present improved methods;

Fig. 2 is an end perspective view, partially in section, illustrating improved apparatus for reeling the cord stock and for then feeding this stock to the band-forming apparatus shown in Fig. 1;

Fig. 3 is a fragmentary side sectional view illustrating certain components of the apparatus shown in Fig. 1;

Fig. 4 is a fragmentary top view of the cord shuttle mechanism embodied in the apparatus shown in Fig. 1;

Fig. 5 is an elevated perspective view of the shuttle assembly illustrated in Fig. 4;

Fig. 6 is a fragmentary top view of the apparatus shown in Fig. 1;

Fig. 7 is a detail view, partially in section, illustrating the cord feed device provided in the apparatus of Fig. 1 to feed cord from the reeling apparatus of Fig. 2 to the shuttle mechanism illustrated in Figs. 4 and 5;

Fig. 8 is an end sectional view taken along the lines 8—8 in Fig. 6, illustrating the band-forming and cord-rolling devices embodied in the apparatus;

Fig. 9 is a plan view illustrating the pattern for or position of the cord stock when wound upon the conveyer of the apparatus and moved through the different zones of the apparatus;

Fig. 10 is a fragmentary view illustrating the disposition of the band-forming material around a segment of the cord stock immediately after the band-forming material is applied thereto;

Fig. 11 is a view similar to that of Fig. 10 illustrating the configuration of the band produced after the band-forming material is allowed to set;

Fig. 12 is a view, partially in section, illustrating the details of the cord cutting device embodied in the apparatus;

Fig. 13 is an end view of the cutting device shown in Fig. 12;

Fig. 14 is a view, partially in section, illustrating the details of the control switch which is provided for controlling the operation of the cutting device shown in Figs. 12 and 13.

Referring now to the drawings and more particularly to Fig. 1 thereof, the present improved apparatus is there illustrated as comprising hanking, band-forming and cutting facilities having a large number of moving parts, the predominant portion of which are supported by a frame indicated generally at 10. The front and back sides of this frame are of like structural pattern, the front side being illustrated in Fig. 1 of the drawings as comprising upright supporting columns 13, 14, 15, 16, 17, 18, 19, and 20, the first four of which rigidly support a horizontally disposed member 11a defining a front section of a conveyer bed, and the last four of which similarly support a horizontally disposed member 12a defining the rear section of the conveyer bed. At the back side of the frame, corresponding horizontal members one of which is indicated at 11b, are provided to complete the conveyer bed assembly, which members are supported upon additional upright posts resepctively aligned with the identified posts located at the front side of the frame. At various points along the conveyor bed, transversely extending supporting and bracing members are provided, certain of which are specifically identified below, in order to obtain a rigid frame assembly.

The described frame 10 is utilized to support for continuous movement an endless conveyor 34 having two spaced apart sections 34a and 34b in the form of endless chains which are respectively supported by the horizontally disposed frame members, run from the front end 10a of the frame to the rear end 10b thereof and are driven in synchronism through a drive shaft 35. The conveyor sections 34a and 34b are identically supported at the front and back sides of the frame. Specifically, the endless section 34a is driven through a drive sprocket 37a fixedly carried by the shaft 35, rides on the top surfaces of the horizontally disposed frame members 11a and 12a, and follows a serpentine path back and forth through two sets of idler rollers or sprockets 38 and 39 supported by and between the upright frame posts 16 and 17. At the rear end 10b of the frame 10, the endless conveyor section 34a rides over an idler roller or sprocket 42 to return to the front end of the frame over a tensioning sprocket 44. The latter sprocket is carried by a floating shaft 45 journalled within a slidably supported and floating bearing member 46 which is spring-biased downward to press the sprocket 44 into engagement with the conveyor section 34a. The rear conveyor section 34b follows an identical path at the back side of the frame 10, this section of the conveyer being driven by a sprocket 37b fixedly carried by the drive shaft 35. In this regard it is noted that the idler sprockets or rollers 38 respectively provided at the front and back sides of the frame 10 are fixedly carried by shafts 40, the center four of which are journalled within bearings carried by a horizontally disposed frame member 22a anchored at its ends to the upright posts 16 and 17. The four lower end sprockets 38a and 38b respectively provided at the front and back sides of the frame are carried by shafts 40a and 40b which are journalled in bearings carried by the posts 16 and 17 at suitable points above the top surfaces of the horizontal frame members 11 and 12. The top rollers 39 respectively provided at the front and back sides of the frame are similarly carried by shafts 41 which are journalled in bearings supported by a horizontal frame member 21a anchored at its ends to the upright posts 16 and 17 adjacent the tops thereof and are similarly supported at the back side of the frame.

For the purpose of driving the described conveyer, driving means are provided which comprise a motor 47 having a rotor shaft pulley 48 belt-connected through a belt 49 and a pulley 50 to an intermediate shaft 51. This shaft is gear-connected through the meshing gears 52 and 53 to the input shaft of a speed reducing gear box 54. The output shaft of this gear box carries a sprocket 55 which is connected through a driving chain 56 to a sprocket 57 mounted for rotation with the conveyor drive shaft 35. It will thus be apparent that high speed rotation of the intermediate shaft 51 serves to drive the two conveyer sections 34a and 34b in synchronism, at a greatly reduced speed which is determined by the gear ratio within the gear box 54.

From the above explanation it will be understood that a continuous conveyer system is provided for moving the cord stock from the front end of the frame 10 to the rear end thereof. The active portions of this system as seen in Fig. 1 of the drawings may be considered as being divided into a cord feed position 23, a band-forming zone 24, a drying zone 25, a cord cutting zone 26, and a cord take-off position 27. The cord stock is fed to the conveyer for bunching into cord sections between the two conveyer sections 34a and 34b by means of a shuttle mechanism indicated generally at 29 and provided at the cord feed position 23. After thus being bunched into sections along the conveyer 34 in the direction of movement thereof, the cord sections are moved through the band forming zone wherein a liquid, air-setting, self-shrinking, band-forming material is fed to a plurality of segments of each cord section by means of two feeding devices 30 disposed in alignment between the front and back sides of the frame. Also within this zone, each cord section is rolled at the front and back ends thereof by means of a pair of rolling devices indicated generally at 31 and also disposed in alignment between the front and back sides of the frame. After the band-forming material is thus deposited and spread over the spaced apart segments of each cord section, the cord sections are moved through a serpentine path within the drying zone 25 to permit the band material to set. Thereafter and upon emerging from the drying zone 25, predetermined ones of the cord sections are cut while traversing the cutting zone 26 by means comprising an electromagnetic knife assembly 33 arranged for control by a micro-switch assembly 32 which is intermittently actuated in accordance with the rate of movement of the conveyer 34. After the cord is thus cut into appropriate lengths of the desired dimensions, the cord sections in each length may be manually removed from the conveyer at the take-off position 27, bunched and tied.

*The cord reeling equipment*

As indicated above, the cord stock is fed to the shuttle mechanism 29 of the apparatus shown in Fig. 1 of the drawings from the cord reeling equipment illustrated in Fig. 2 of the drawings. In brief, this equipment comprises a pair of large reels 59 and 60 to which the cord stock 8 may be fed from spools 9 through overhead guide eyes 85 and 86. The reels 59 and 60 are respectively carried by shafts 61 and 62 which are journalled within bearings supported by front and back upright frame members 58a and 58c forming a part of the reel frame indicated generally at 58. Treadle operated brakes of the character conventionally used in automotive vehicles are utilized normally to prevent rotation of the identified reels 59 and 60. Thus a brake mechanism 63 is provided at the illustrated front end of the reel 59 for normally restraining this reel against rotation. Release of this brake is effected through a brake actuating arm 65 pivotally connected at its actuating end to one of the treadle bars 67a of a foot treadle 67. This treadle bar is pivotally mounted at 69 upon the frame member 58c and is normally spring-biased to a brake setting position by means of a heavy tension spring 71 connected between the inner end of the bar 67a and the base of the frame 58. A brake 64 is similarly provided at the illustrated front end of the reel 60 normally to restrain this reel against rotation. This brake includes an actuating arm 66, the lower end of which is pivotally connected to a treadle bar 68a forming a part of a second foot treadle 68 disposed upon the opposite side of the frame 58 from the foot treadle 67. The treadle bar 68a is pivotally mounted at 70 upon the upright frame member 58a and is normally biased to its brake setting position by means of a heavy tension spring 72, the ends of which are respectively connected to the inner end of the bar 68a and the base of the frame 58. For the purpose of selectively driving the reels 59 and 60, a driving mechanism is provided which includes a motor 73 having a shaft pulley 74 belt-connected by means of a belt 75 to a pulley 76 fixedly carried by a common drive shaft 77 which is bearing supported at its ends by the front and back frame members 58b. A belt 79, pulley connected between the shaft 77 and the reel 60 may be utilized to drive this reel. Similarly a belt 80 pulley connected with the shaft 77 and the reel 59 may be utilized to drive the latter reel. Selective rotation of the reels 59 and 60 for reeling and unreeling purposes is accomplished by selective removal of the belts 79 and 80 from the pulleys provided to carry the same. For the purpose of energizing the motor 73 on a selective basis to drive either of the two reels 59 or 60 during a cord reeling operation, two parallel connected mercury switches 83 and 84 are provided which are respectively supported at the inner ends of the treadle bars 67a and 68a. Each of these switches is so positioned relative to the horizontal frame member that when the associated treadle occupies its illustrated normal position, the circuit therethrough is open, and when the associated treadle is moved to a position for releasing the brake mechanism of the associated reel the circuit therethrough is closed. These two switches are connected in parallel in the circuit for energizing the motor 73 so that when either thereof is moved to its closed circuit position the desired operating circuit for the motor 73 is completed.

As indicated above, the cord may be selectively fed to the two reels 59 and 60 through the two overhead eyes 85 and 86. For the purpose of preventing the cord from piling up at a particular point along either of these reels during a reeling operation, the eye 86 is supported for back and forth movement along a line parallel to the axes of rotation of the two reel supporting shafts 61 and 62. Specifically, the eye-piece 86 is supported by means of a bearing pin 86c and a grooved roller 86b upon an elevated roller wire 87 extending substantially parallel to each of the two shafts 61 and 62. A struck-out portion 86d of the eye may be utilized as a guard to prevent the roller from jumping the wire 87. This eye piece is also provided with a projecting hook part 86a adapted to be engaged by a hook or eye ended stick for the purpose of moving the eye 86 back and forth along the wire 87.

Briefly to consider the manner in which the cord stock is formed and then delivered to the reels 59 and 60, and thereafter to the shuttle mechanism 29 of the apparatus shown in Fig. 1 of the drawings, it is first pointed out that these reels are alternately used for reeling and unreeling operations, viz., when one reel is being used to deliver cord stock to the shuttle mechanism 29, the other reel is operated to replenish the supply of cord stock thereon. Since the cord is supplied to the reels from small cord spools 9, it is necessary before starting and during a reeling operation to splice the ends of a number of cord spools in order to have an adequate supply of cord stock available as the reeling operation proceeds. The splicing is accomplished manually and in a manner such that there is no discernible connection between the cord lengths of the different spools.

Briefly to consider the manner in which the cord stock is reeled upon the reel 59, for example, it may be pointed out that before starting such a reeling operation the belt 79 is removed from its pulleys to interrupt the driving connection between the shaft 77 and the reel 60, and that before the reeling operation is started the available end of the cord stock 8 is tied to a tie-post provided at the surface of the reel drum. After these preliminary operations are completed, the foot treadle 67 may be depressed against the bias afforded by the spring 71 to move the brake actuating arm 65 upward and thus release the brake 63 to permit rotation of the reel 59. As the inner end of the treadle bar 67a is raised to an elevated position, the mercury switch 83 is actuated to close the operating circuit for the motor 73 and thus initiate rotation of the reel 59 through the described driving connection comprising the belt 75, the shaft 77 and the belt 80. As the cord reeling operation proceeds, the attendant charged with supervision thereof may move the eye-piece 86 back and forth along the wire 87 for the purpose of distributing the cord evenly over the surface of the reel drum.

Concurrently with the described reeling operation, the cord stock previously accumulated upon the reel 60 may be fed to the shuttle mechanism 29. To this end, the outer end of the cord stock carried by the reel 60 is spliced to the end of the cord stock previously delivered to shuttle mechanism from the reel 59. Before operation of the apparatus shown in Fig. 1 of the drawings is resumed after the described cord splicing operation is completed, the foot treadle 68 is depressed to release the brake 64 and close the switch 84 in a manner clearly apparent from the above explanation. The resulting operation of the motor 73 to drive the shaft 77 is without effect insofar as the reel 60 is concerned, since the driving connection between this reel and the shaft 77 is interrupted through removal of the belt 79 from its pulleys. Release of the brake 64 permits the cord stock, a segment of which is indicated at 8e, to be pulled from the reel 60 when operation of the apparatus shown in Fig. 1 is resumed. The manner in which the supply of cord stock may be replenished upon the reel 60 concurrently with removal of the cord stock from the reel 59 will be entirely apparent from the above explanation. It will also be apparent from this description that the equipment illustrated in Fig. 2 of the drawings provides for a substantially continuous supply of cord stock to the apparatus shown in Fig. 1 of the drawings with only minimum periods of interruption in the operation of the latter apparatus.

*Feeding the cord to the shuttle mechanism 29*

Referring now more particularly to the manner in which the cord stock 8 is delivered to the shuttle mechanism 29, it is pointed out that after removal from the reel 60, for example, the cord passes through a stationary eye-piece 88 fixedly mounted upon the frame 10 and provided with an eye opening therethrough having a diameter only slightly exceeding the diameter of the cord stock 8. This eye-piece functions as a knot detector in that if a knot appears in the cord stock it will engage the eye-piece 88 and prevent further feeding of the cord stock to the shuttle mechanism 29. After passing through the eye-piece 88, the cord stock enters a pulling device indicated generally at 89, which is disposed beneath the bed of the frame 10 and is driven by the motor 47 through the shaft 51. This device is illustrated in Fig. 7 of the drawings as comprising three rollers 90, 91 and 92, the first and last of which are respectively carried at the ends of two pivotally supported arms 94 and 95, and are spring-biased toward the intermediate roller 91 by means of a tension spring 97 interconnecting the identified arms. These arms have a common pivot rod 96 which may be supported from the base or frame 10 of the apparatus in any desired manner. The middle roller 91 is provided with a knurled or roughened outer surface for frictionally engaging the cord stock 8 and is mounted for rotation with the shaft 51 to be driven at a relatively high speed by the motor 47. With this arrangement, the two rollers 90 and 92 function to maintain a continuously changing segment of the cord stock wrapped tightly around a large portion of the peripheral surface of the middle roller 91, whereby rotation of the latter roller serves to pull the cord stock from the reel 60, for example, for delivery to the shuttle mechanism 29.

After passing between the three take-off rollers 90, 91 and 92, the cord stock is passed over a pair of guide pulleys 98 and 99, Fig. 6, rotatably supported by the frame 10, following which it is delivered to the shuttle mechanism 29 through a pair of overhead pulleys 100 and 101, Fig. 1. Intermediate the two last mentioned pulleys, a counterweighted pulley 102 is supported by the cord stock to maintain the proper tension therein as this stock is fed to the shuttle mechanism. More specifically, the counterweight assembly comprises a pulley or roller 102 riding upon the cord stock intermediate the two pulleys 100 and 101 and supporting a counterweight 103 of appropriate size to maintain the desired cord tension. The counterweight assembly, in cooperation with the knot detecting eye-piece 88, is also utilized automatically to stop the operation of the apparatus in the event a knot appears in the cord stock. To this end, the counterweight 103 is connected by means of a flexible link 104 to the actuating end of a switch operating arm 105 extending from a cutoff switch 106, the contacts of which are included in the circuit for energizing the motor 47. This circuit also includes a manually operable start-stop switch 107 connected in series with the cutoff switch 106, the motor being adapted for energization from a current source indicated by the bracketed terminals 108.

With the described arrangement, it will be understood that when a knot appears in the cord stock and engages the detecting eye-piece 88, further movement of the stock through this piece is arrested. As a result and as the slack between the pulleys 100 and 101 is taken up, the counterweight assembly is elevated toward the two pulleys 100 and 101. After a predetermined amount of upward movement of the weight 103, the cord 104 is pulled taut, following which the arm 105 is actuated to move the switch 106 to its open circuit position and thus de-energize the motor 47. Thus operation of the apparatus is arrested. After the cutoff switch 106 has been actuated to its open circuit position in the manner just described, it must obviously be manually reset to its closed circuit in order to reinitiate operation of the motor 47.

*The shuttle mechanism 29*

As indicated above, the shuttle mechanism 29 is provided for the purpose of weaving the cord stock 8 back and forth between the conveyer sections 34a and 34b so that it is bunched into a serpentine pattern of the character illustrated in Fig. 9 of the drawings having cord sections 8c which are of substantially the same length. Specifically, this mechanism serves to wrap the cord stock around different pairs of cord holding elements or pins 109a and 109b respectively provided in rows along the outer surfaces of the conveyer sections 37a and 37b. As best shown in Figs. 3 and 8 of the drawings, each pair of pins is fixedly mounted upon one link of one of the chains making up the respective conveyer sections 34a and 34b, and the spacing between the pins is such that the cord sections 8c are substantially equally spaced apart throughout the length thereof after the cord stock weaving operation is performed in the manner described below.

Briefly considered and as best shown in Figs. 3, 4, 5 and 6 of the drawings, the shuttle mechanism 29 comprises a cord feed eye or sleeve 115 having the function of wrapping the cord stock alternately around different pairs of pins respectively carried by the carriage sections 34a and 34b to form the cord pattern, and an operating assembly driven synchronously with the conveyer for actuating the sleeve 115. This assembly comprises a multipart carriage structure made up of the four stacked and rigidly connected parts 110, 111, 112a and 112b the first of which mounts a centrally disposed bearing member 110a journalled for sliding movement back and forth along a slide rod 119. This rod extends between the front and back sides of the frame 10 and is fixedly anchored at its ends to supporting posts 28a mounted upon a transversely extending frame member 28. In order to restrain the carriage structure against rotation about the slide rod 119, the carriage member 110 is provided with an upwardly projecting pivot pin 110c which carries a roller 110b confined within the guide surfaces of a channeled guide rail 120, which rail likewise extends between the front and back sides of the frame and at its ends is rigidly supported by the frame in any desired manner. It will thus be seen that the carriage structure is supported for back and forth sliding movement between the two conveyer sections 34a and 34b but is restrained against rotation relative to the slide rod 119. In order to assist in decelerating and stopping the carriage structure at the end of each stroke of movement thereof along the rod 119 without undue shock to this structure and the parts supporting the same, cushioning springs 130 of the compression type are respectively provided at the ends of the rod 119 to be engaged by the projecting ends of the bearing member 110a. These stop springs are anchored at their outer ends to the supporting posts 28a.

For the purpose of reciprocating the shuttle mechanism 29 back and forth between the conveyer sections 34a and 34b at a speed which is synchronous with the movement of the conveyer from the front to the back ends of the frame, a driving mechanism is provided between the motor driven shaft 51 and the described carriage structure. This driving mechanism comprises a chain 128, which together with sprockets 129 and 127, provides a driving connection between the shaft 51 and a second shaft 126 journalled in a bearing member carried by the frame 10. The second shaft 126 is in turn connected through a pair of meshing bevel gears 125 to drive a third shaft 124 also rotatably supported by a bearing post extending upwardly from the frame member 28. The latter shaft in turn is arranged to drive a chain 121 which extends between the conveyer sections 34a and 34b and is carried by sprockets 122 and 123, the second of which is mounted for rotation with the shaft 124 and the first of which is carried by an idler shaft 122a journalled in a bearing 122b supported by the frame member 28. It will thus be understood that the chain 121 is driven at a relatively high speed as compared with the speed of movement of the conveyer 34 and that the upper and lower sections of this chain travel in opposite directions between the front and back sides of the frame and hence between the two conveyer sections. A pin and slide connection between the chain 121 and the described carriage structure of the shuttle mechanism 29 is utilized to translate the continuous rotary movement of the chain into back and forth sliding movement of the shuttle mechanism along the slide rod 119. More specifically, this connection comprises a pin 122' which is fixedly mounted upon one of the links of the chain 121 to project within the slide channel 113a of a slide member 113. This slide member is fabricated or otherwise rigidly connected to the two carriage parts 110 and 111, and projects upwardly from the carriage part 111 across the upper and lower sections of the chain 121. With this arrangement, and during continuous rotary movement of the chain 121, the pin 122' travels toward the conveyer section 34a with the upper section of the chain during alternate half revolutions of the chain and toward the conveyer section 34b with the lower section of the chain during the intervening half revolutions of the chain. It will be seen, therefore, that when the pin 122' is traveling with the upper chain section it engages the slide channel 113a adjacent the upper end of the member 113 to move the carriage structure in the direction of movement of the upper chain section. Upon reaching the end of the upper chain section and upon being moved around the sprocket 123 to travel with the lower chain section this pin is slid downward along the channel 113a to a point adjacent the lower end of the member 113. During such sliding movement of the pin 122' within the channel 113a it brakes the movement of the carriage structure, slows this structure to a standstill and then reverses the direction of movement thereof. Conversely, as the pin 122' is moved around the sprocket 122 from the lower chain section to the upper chain section it brakes and reverses the direction of movement of the carriage structure and incident thereto slides from the lower end of the member 113 to the upper end thereof. Thus continuous rotary movement of the chain 121 is translated into back and forth sliding movement of the shuttle mechanism 29.

More specifically to consider the manner in which the cord stock is wrapped alternately around different pairs of the pins 109a and 109b, it is pointed out that the relative speeds of the conveyer 34 and the shuttle mechanism 29 are such that during movement of this mechanism from the front side of the frame to the back side thereof as seen in Fig. 6 of the drawings, the conveyer is moved a distance approximately equal to the distance separating the pin 109e and the pin 109g in the direction of conveyer movement. In order therefore, to wrap the cord stock around the paired pins 109f and 109g at the end of the described shuttle stroke, it is necessary to move the cord feed sleeve 115 forward in the direction of movement of the conveyer. This is accomplished by fixedly supporting the sleeve 115 within an opening through a slide bar 114 which extends through the lower carriage parts 112a and 112b, and by rapidly moving the slide bar 114 first in the direction of movement of the conveyer 34 and then in the reverse direction as the sleeve 115 approaches and then goes beyond the pins 109f and 109g at the extreme end of the described shuttle stroke. V-shaped slide surfaces between the parts 112a, 112b and 114 and provided at the edges of the slide bar 114 are utilized slidably to support this bar and the parts carried thereby for the described oscillatory movement. Normally, the cord guide sleeve 115 is retracted to engage the adjacent surface of the carriage member 110 by means of coil springs 117 disposed upon opposite sides of the carriage structure and tensioned between a bar 116 extending transversely across the end of the slide bar 114 and screws 118 threaded into the sides of the carriage structure parts 112a and 112b.

A cam and cam follower assembly is utilized to convert the described movement of the shuttle mechanism along the slide bar 119 into movement of the slide bar 114 in the direction of movement of the conveyer 34 at the end of each shuttle stroke. More specifically, the cam follower is in the form of a roller 118 axis mounted upon the underside of the slide bar 114 at the rear end thereof. This cam follower is adapted to engage the camming surface 133a of a two-part cam assembly 131 as the shuttle mechanism is moved to approach the conveyer section 34b, and is adapted to engage the similar camming surface of an identical but oppositely directed two-part cam assembly as the shuttle mechanism approaches the opposed conveyer section 34a. In brief, the cam assembly 131 comprises a straight elongated member 132 which is pin mounted upon the frame member 28, and a curved elongated cam member 133 which is mounted for pivotal movement relative to the cam member 132 by means of a pivot pin 134. The member 133 is normally biased to the full line position illustrated in Fig. 4 of the drawings by means of a coil spring 135 the ends of which are pin connected respectively to the frame member 28 and the cam member 133 at the underside of the latter member. A pin and slot connection comprising an extension of the spring anchor pin 135a and a slot 135b in the frame member 28 is utilized to limit the extent of pivotal movement of the member 133 between the illustrated full line and dash line positions thereof.

From the above explanation it will be understood that as the shuttle mechanism 29 is moved to carry the cord feed sleeve 115 from the pin 109e toward the paired pins 109f and 109g, the conveyer 34 is concurrently moved in a direction to actuate the pin 109f beyond the sleeve 115. However, as the shuttle mechanism approaches the end of the shuttle structure the cam roller 118 engages the camming edge 133a of the described cam assembly 131. As the roller 118 rides up this edge, it is forced toward the slide rod 119, with the result that the slide bar 114 is moved against the bias of the springs 117 in the direction of movement of the conveyer 34 but at a much higher speed. Accordingly, as the shuttle mechanism reaches the extreme end of the described shuttle stroke, the cord feed sleeve 115 is moved to a position ahead of the pin 109f to permit the cord stock 8 to be passed around this pin. After the sleeve 115 has moved beyond the pin 109f in the direction of movement of the shuttle mechanism, the cam roller 118 drops off of the end of the cam member 132 permitting the slide assembly to be retracted to its normal setting under the influence of the biasing springs 117. Incident to this movement of the slide bar assembly relative to the other parts of the carriage structure, the feed sleeve 115 is moved to a position lagging the pin 109g, thereby to wrap the cord stock around the two pins 109f and 109g. Immediately after the slide bar assembly is thus retracted, the direction of movement of the shuttle mechanism 29 is reversed in the manner described above to tension the cord stock around the two pins 109f and 109g and start the formation of another cord section between the two conveyer sections 34a and 34b. During the initial movement of the shuttle mechanism 29 in the reverse direction, i. e., from the conveyer section 34b toward the conveyer section 34a, the roller 118 reengages the pivotally mounted camming member 133a along the opposite edge thereof. Such engagement is without functional significance, but it is noted that after the two identified parts are brought into engagement, the member 133a is pivoted in a counterclockwise direction as viewed in Fig. 4 of the drawings against the biasing action of the spring 135 permitting this member to be moved out of the path of movement of the roller 118. When the shuttle mechanism is moved to a predetermined point along its return path, the roller 118 drops off of the end of the cam member 133a permitting this member to return to its illustrated full line position under the influence of the spring 135.

The manner in which the cam roller 118 coacts with the cam assembly provided at the opposite end of the slide rod 119 to move the slide assembly so that the cord stock 8 is wrapped around the next pair of pins carried by the conveyer section 34a is exactly the same as described above and will be fully apparent from this explanation. It will also be apparent that as the back and forth movement of the shuttle mechanism is continued in the described manner, the cord stock 8 is woven into the serpentine pattern illustrated in Figs. 6 and 9 of the drawings.

*The band forming and cord rolling equipment*

As the cord stock 8 is bunched into cord sections 8c of substantially the same length through the above described action of the shuttle mechanism 29, the cord sections are continuously moved through the band forming zone 24 where the desired bands are formed at spaced intervals therealong through the action of two material feed devices 30 and two associated cord segment rolling devices 31. As best shown in Fig. 6 of the drawings, the feed devices 30 are accurately located at predetermined positions between the conveyer sections 34a and 34b, and each thereof is capable of feeding the material required in the formation of two separated bands accurately to two predetermined segments of each cord section which moves through the zone 24. Thus facilities are provided for concurrently forming the bands on the cord sections four at a time. The cord rolling devices 31 are similarly spaced inwardly from the front and back sides of the frame 10 in appropriate positions to roll the cord segments to which the band forming material is fed.

The cord material feeding devices 30 are of identical construction and arrangement and are commonly fed with an air-setting, self-shrinking, band forming liquid from a reservoir of the liquid through a conduit system which includes the illustrated conduits 30a, 30b, and 30c. Compressed air is preferably used to force this liquid through the conduits to the two feeding devices 30. Although any band-forming material having the desired characteristics just referred to may be used, this material is preferably an air-setting plastic having the characteristics of non-inflammability. It has been found that a liquid well suited for formation of the bands may be made by mixing cellulose acetate with acetone in the ratio of 7 lbs. of cellulose acetate to 5 gallons of acetone.

The two feeding devices 30 are supported by a frame member 159, Fig. 3, disposed above the conveyer 34 and anchored at its ends to the frame members 11a and 11b. These devices are nothing more than adjustable feed nozzles, one thereof being illustrated in Figs. 3 and 8 of the drawings as comprising a nozzle shell 136 supported by bracket 160 extending outwardly from the frame member 159, and having two nozzle openings 136a and 136b spaced apart longitudinally of the cord sections 8c. This nozzle includes a knurled feed adjusting stem 136c which may be manually adjusted to vary the rate of feed of the liquid band-forming material. It also includes a feed cut-off valve having an actuating arm 161 which may be actuated toward the nozzle shell 136 to start the feeding operation and is normally biased to its feed cut-off setting. A spring 162 thrusting against the frame member 159 may be used to actuate the arm 161 to the setting required to open the nozzle.

From the above explanation it will be understood that so long as the valve actuating arm 161 is held in a setting such that the feed path is open between the conduit 137 and the two nozzle openings 136a and 136b, liquid band-forming material is extruded from the ends of these nozzles at a rate determined by the setting of the feed control element 136c. These nozzles are respectively disposed over two troughs which are elongated in the direction of movement of the cord sections 8c, such that as the cord sections are moved beneath the nozzles and over the trough structure, the liquid band-forming material is fed to two segments of each cord section. In brief, the trough structure is comprised of two side members 139, a center filler 139a and a channel-shaped central member 138. With this arrangement and during continuous feed of the band-forming material, this material forms pools in the two troughs 140a and 140b, the surfaces of which are contacted by the segments of the cord sections as the cord sections are moved across the trough structure. A similar trough structure is provided in association with the feed device 30 disposed adjacent the front side of the frame 10.

In order to spread the band-forming material over the segmental surfaces of the cord sections as they are moved across the above described trough structures, the two cord rolling devices 31 function to rotate the coated cord segments relative to the surfaces of the pools in the troughs. These two cord rolling devices are of identical construction, that provided adjacent the rear side of the frame 10 being illustrated in Fig. 3 of the drawings as comprising a friction shoe 143 slidably mounted by means of pins 144 upon a crosspiece 145 which is fixedly mounted upon a frame member 142 extending transversely inward from the frame member 11b. This shoe is spring-biased downward to engage the upper peripheral segments of the cord sections passing over the trough structure by means of springs 146 tensioned between the upper surface of the shoe and the under surface of the crosspiece 145. Rolling movement of the cord sections across the under surface of the friction shoe 143 is obtained by squeezing the cord sections between the under surface of the shoe 143 and the upper surface of an endless rotary belt 147. This belt is supported between two drive pulleys 148 and 149 which are mounted for rotation with a pair of shafts 150 and 151 extending transversely between the front and back sides of the frame 10. A chain and sprocket driving assembly comprising the chain 153 and sprockets 155 and 155a is utilized to provide a one to one driving connection between the two shafts so that the pulleys 149 and 148 are rotated in unison. The shaft 151 is, in turn, driven from the conveyer drive shaft 35 by means of a chain and sprocket assembly which includes a sprocket carried by the shaft 151, a chain 156 and a sprocket 158 carried by the shaft 35, Fig. 6. The drive ratio between the shaft 35 and the shaft 151 is such that the speed of linear movement of the belt 147 is slightly greater than the speed of movement of the cord sections from the front to the rear ends of the frame 10.

It will thus be understood that as the cord sections are moved from beneath the feed nozzles of the two feed devices 30 across the liquid surfaces of the two trough structures, uncoated segments thereof are moved between the belts 147 and the shoes 143 of the two rolling devices 31 to be frictionally gripped between these elements so that they are rolled or rotated relative to the liquid pool surfaces. As a consequence of this rolling movement, the liquid band-forming material is distributed with reasonable evenness over the surfaces of the segments thereof and all excess material is removed.

After the cord sections are thus coated with the band-forming material at four spaced points along the length of each thereof, they are moved through the drying zone 25 of the apparatus wherein they follow a serpentine path of considerable overall length. During movement of the cord sections through this portion of the apparatus, the band-forming material is permitted to dry and set. In this regard, it is noted that the length of the overall path through the drying zone 25 is so related to the speed of movement of the conveyer 34 and the air-setting characteristics of the particular band-forming material employed, as to insure that the bands formed upon the cord segments will be reasonably dry upon emerging from the drying zone 25.

As indicated above, a mixture of cellulose acetate and acetone is utilized in formation of the bands at spaced intervals along the cord stock. This material has the property of shrinking as it sets, and is non-inflammable when dry. Thus and as best shown in Figs. 10 and 11 of the drawings, a band 7 of the acetate-acetone mixture is formed around a segment of the cord stock 8 during the described coating operation. This mixture penetrates and impregnates the cord strands, and as it dries shrinks from the enlarged diameter shown in Fig. 10 of the drawings to the smaller diameter shown in Fig. 11 of the drawings. In practice it has been found that the final diameter of the band is slightly less than the cord diameter. As a result, the cord is compressed within the band during the air-setting of the band material. Further, the band is tightly bonded to the cord and will not crack or peel when subjected to normal wear and usage. It is also impervious to moisture.

*The cord cutting device*

After the coated cord sections emerge from the drying zone 25 of the apparatus, the cutting device 33 functions automatically to cut the cord into predetermined lengths. This device is illustrated in Fig. 1 of the drawings as being provided adjacent the front side of the frame 10, but it will be understood that additional cutting facilities may, if desired, be provided along the rear side of the frame within the cutting zone 26. The details of the cutting device 33 are best illustrated in Figs. 12 and 13 of the drawings. As there shown, this device comprises a knife blade 175, having its lower cutting edge extending in the direction of movement of the cord sections 8c through the zone 26, and mounted within a holder 176 which is fixedly supported upon the underside of a frame member 177 projecting inwardly from the side frame member 12a. A guard 178 of circular configuration is also supported by the frame member 177 to enclose the knife 175 and thus prevent access to the cutting edge of the knife during operation of the equipment. Predetermined ones of the cord sections 8c are moved into cutting engagement with the edge of the blade 175 by means of a cutter head 179a provided at the end of an arm 179 which is supported beneath the bed plate 11c across which the cord sections pass. This head is arranged to be intermittently actuated by means of a solenoid 183. More specifically, the arm 179 is axis mounted at one end upon a pivot pin 180 journaled within a bearing member 181. This bearing member and the solenoid 183 are supported upon a transversely extending frame member 182 which extends transversely inward from the frame member 12a. The cutter head 179a is provided with a slot 179d adapted to receive the blade 175 therewithin and has a V-shaped mouth 179c for guiding the cutting edge of the blade thereinto. The upper surface of the head 179a is also provided with a transversely extending V-shaped notch 179b for receiving the cord as it is moved into engagement with the cutting edge of the blade 175. Normally, the arm 179 occupies the position illustrated in Figs. 12 and 13 of the drawings. This arm is adapted to be rotated so that the head 179a thereof is moved upward through the opening in the bed plate 12c to bring a cord section into engagement with the cutting edge of the blade 175, by means of the solenoid 183. To this end, the identified solenoid is provided with a plunger 184 having a pivotally supported roller 185 at the upper end thereof against which the underside of the arm 179 bears. This plunger is spring-biased to the illustrated normal position thereof by means of a coil spring 186 tensioned between the lower end of the plunger and a suitable point upon the frame 10.

From the above explanation, it will be understood that each time the solenoid 183 is energized, a cord section 8c will be severed at a predetermined point along the length thereof only in the event energization of the solenoid occurs when the cord section is aligned with the V-notch 179b provided transversely of the head 179a. In order to provide for the operation of the solenoid 183 synchronously with movement of predetermined cord sections into alignment with the notch 179b, the control device 32 illustrated in Fig. 14 of the drawings is provided. In brief, this device comprises a switch 165 having a switch closing plunger 173 arranged for operation by an actuating spring 174 supported at the lower side thereof. This spring is positioned directly over the pins 109a carried by the conveyer section 34a and is adapted to be intermittently moved upward to actuate the plunger 173 to its circuit closing position by means of pins 109c of greater length or height than the other pins. The separation between the pins 109c is determined by the number of cord sections which it may be desired to include in a given hank of the banded cord stock. The switch 164 is adjustably supported from the transversely extending frame member 166 by means of an adjustable supporting assembly which comprises a cross member 167 rigidly mounted upon the underside of the frame member 166. An L-shaped bracket piece 168 is adjustably supported at any desired height above the conveyer section 34a by means of bolts 169 which are anchored to the ends of the bracket piece and extend through openings in the cross member 167. Nuts 170 adjustably positioned along the threaded sections of the bolts 169 upon opposite sides of the cross member 167 are utilized to fix the height of the bracket piece 168 above the conveyer section 34a. The switch 165 is slidably supported by the bracket piece 168 by means of slide lugs 171 extending upward from the top wall thereof. For the purpose of moving the switch back and forth along the bracket piece 168 to any desired adjusted position, an adjusting screw 172 is provided which extends through an opening in the downwardly depending portion 168 of the bracket piece and is threaded into the lug 171. A C-washer 172a seated in a ring groove provided along the screw 172 at the rear side of the bracket part 168a is utilized to prevent movement of the screw longitudinally of the bracket piece. It will thus be apparent that the switch 165 is supported for adjustment to different heights above the conveyer section 34a and to different positions along the path of movement of this conveyer section.

As indicated by the above explanation, the circuit controlling contacts of the switch 165 are serially included in the operating circuit for the solenoid 183 so that each time a high pin 109c engages the end of the spring 174, the plunger 173 is actuated to close the operating circuit for the solenoid 183 and thus effect movement of the cutting head 179a into engagement with the cutting blade 175. It will also be understood that each time a high pin 109c passes from beneath the spring 174, this spring is released, permitting the contacts of the switch 165 to open and thus de-energize the solenoid 183, with the result that the plunger 184 and the head 179a of the arm 179 are retracted under the influence of the spring 186. It will be apparent, therefore, that by appropriately spacing the high pins 109c along the conveyer section 34a and by appropriately adjusting of the switch 165 longitudinally of the conveyer section 34a, the cutting device 33 may be caused intermittently to operate for the purpose of severing predetermined ones of the cord sections at predetermined points along the length thereof.

After the cord stock with the bands formed thereon has been cut into lengths through the operation of the cutting device 33 and its associated control device 32, the cord sections in each length may be manually removed from the holding pins 109 at the cord take-off position 27. In this regard, it will be noted that the cord stock is substantially completely hanked when it reaches the cord take-off position 27. Accordingly, it may be readily bunched and tied with but little manual labor.

From the foregoing explanation it will be clearly apparent that the described methods and apparatus provide for substantially uninterrupted production of the banded cord lengths with but a minimum of manual labor. Thus the bands are formed in groups and dried, and the cord stock is cut into the desired lengths without in any way stopping movement of the cord stock through the apparatus. These features contribute to the production of the banded cord lengths at very low cost.

While there has been described what is at present considered to be the preferred embodiment of the invention, it will be understood that various modifications may be made therein which are within the true spirit and scope of the invention as defined in the appended claims.

I claim:

1. Apparatus for forming bands at predetermined intervals along a cord, comprising means for continuously weaving the cord back and forth to form a serpentine cord pattern the sections of which are of substantially the same length and for holding the cord so that the cord sections are separated, means for moving said cord along a plane in a direction normal to said cord sections, and means for applying bands to at least certain of said cord sections as said cord sections are moved past a predetermined point in the path of movement thereof by coating said sections with a liquid band forming material.

2. Apparatus for forming bands at predetermined intervals along a cord, comprising means for bunching the cord into sections of substantially the same length while maintaining the sections separated, means for feeding a liquid band-forming material to certain segments of at least certain of said cord sections, and means for rolling said certain segments of the cord sections to spread the band-forming material around the segmental surfaces thereof.

3. Apparatus for forming bands at predetermined intervals along a continuous cord and for then cutting the cord into lengths, comprising means for continuously bunching the cord into sections of the same length while maintaining the sections separated and for then moving the bunched and separated cord sections through a drying zone, means for feeding a liquid band-forming material to certain segments of at least certain of said cord sections, means for rolling said certain segments of the cord sections to spread the band-forming material around the segmental surfaces thereof before said cord sections enter said drying zone, and means controlled in accordance with the movement of said cord sections through said zone for cutting the cord into predetermined lengths after said cord sections emerge from said drying zone.

4. Apparatus for forming bands at predetermined intervals along a continuous cord and for then cutting the cord into lengths, comprising a continuous conveyer provided with spaced cord holding sections, frame means supporting said conveyer sections for synchronous movement from a cord feed position through a band drying zone to a cord take-off position, means operated synchronously with the movement of said conveyer sections for feeding the cord back and forth between the holding sections of said conveyer, thereby to bunch the cord into sections which are spaced apart in the direction of movement of said conveyer, and means for coating certain segments of at least certain of said cord sections with a liquid band-forming material during movement of said cord sections from said cord feed position to said drying zone.

5. Apparatus for forming bands at predetermined intervals along a continuous cord and for then cutting the cord into lengths, comprising a continuous conveyer provided with spaced cord holding sections, frame means supporting said conveyer sections for synchronous movement from a cord feed position through a band drying zone to a cord take-off position, means operated synchronously with the movement of said conveyer sections for feeding the cord back and forth between the holding sections of said conveyer, thereby to bunch the cord into sections which are spaced apart in the direction of movement of said conveyer, means for coating certain segments of at least certain of said cord sections with a liquid band-forming material during movement of said cord sections from said cord feed position to said drying zone, and means controlled in accordance with the movement of said cord sections through said zone for cutting the impregnated cord into predetermined lengths after said cord sections emerge from said drying zone.

6. Apparatus for forming bands at predetermined intervals along a continuous cord and for then cutting the cord into lengths, comprising a continuous conveyer provided with spaced cord holding sections, frame means supporting said conveyer sections for synchronous movement from a cord feed position through a band drying zone to a cord take-off position, means operated synchronously with movement of said conveyer sections for feeding the cord back and forth between the holding sections of said conveyer, thereby to bunch the cord into sections which are spaced apart in the direction of movement of said conveyer, means for feeding a liquid band-forming material to certain segments of at least certain of said cord sections, and means for rolling said certain segments of the cord sections to spread the band-forming material around the segmental surfaces thereof before said cord sections enter said drying zone.

7. Apparatus for forming bands at predetermined intervals along a continuous cord and for then cutting the cord into lengths, comprising a continuous conveyer provided with spaced cord holding sections, frame means supporting said conveyer sections for synchronous movement from a cord feed position through a band drying zone to a cord take-off position, means operated synchronously with movement of said conveyer sections for feeding the cord back and forth between the holding sections of said conveyer, thereby to bunch the cord into sections which are spaced apart in the direction of movement of said conveyer, means for feeding a liquid band-forming material to certain segments of at least certain of said cord sections, means for rolling said certain segments of the cord sections to spread the band-forming material around the segmental surfaces thereof before said cord sections enter said drying zone, and means controlled in accordance with the movement of said cord sections through said zone for cutting the cord into predetermined lengths after said cord sections emerge from said drying zone.

8. Apparatus for forming bands at predetermined intervals along a continuous cord and for then cutting the cord into lengths, comprising a continuous conveyer provided with spaced apart rows of cord holding elements, frame means supporting said conveyer for movement from a cord feed position through a serpentine band drying zone to a cord take-off position, reciprocally movable shuttle means operated synchronously with said conveyer for weaving the cord back and forth between the spaced apart cord holding elements of said conveyer, thereby to bunch the cord into sections which are spaced apart in the direction of movement of the conveyer, and means for impregnating certain segments of at least certain of said cord sections with a liquid band-forming material during movement of said cord sections from said cord feed position to said drying zone.

9. Apparatus for forming bands at predetermined intervals along a continuous cord and for then cutting the cord into lengths, comprising a continuous conveyer provided with spaced apart rows of cord holding elements, frame means supporting said conveyer for movement from a cord feed position through a serpentine band drying zone to a cord take-off position, shuttle means operated synchronously with said conveyer for weaving the cord back and forth between the spaced apart cord holding elements of said conveyer, thereby to bunch the cord into sections which are spaced apart in the direction of movement of the conveyer, means for impregnating certain segments of at least certain of said cord sections with a liquid band-forming material during movement of said cord sections from said cord feed position to said drying zone, predetermined ones of said cord holding elements being of different length than the other cord holding elements, control means repeatedly operated by engagement with said predetermined cord holding elements, and cutter means operative in response to operation of said control means to cut the cord into predetermined lengths after said cord sections emerge from said drying zone.

10. Apparatus for forming bands at predetermined intervals along a cord, comprising a continuous conveyer provided with spaced apart rows of cord holding elements, frame means supporting said conveyer for movement from a cord feed position through a band-forming position, shuttle means operated synchronously with said conveyer for weaving the cord back and forth between the spaced apart cord holding elements of said conveyer as said conveyer moves through said cord feed position, thereby to bunch the cord into sections which are spaced apart in the direction of movement of the conveyer, means for feeding a liquid band-forming material to certain segments of at least certain of said cord sections, and stationary means providing a liquid pool of said band-forming material the surface of which is engaged by the coated segments of the cord sections to spread the band-forming material around the segmental surfaces thereof as said cord sections are moved away from said band material feeding means.

11. Apparatus for forming bands at predetermined intervals along a cord, comprising a continuous conveyer provided with spaced apart rows of cord holding elements, frame means supporting said conveyer for movement from a cord feed position through a band-forming position, shuttle means operated synchronously with said conveyer for weaving the cord back and forth between the spaced apart cord holding elements of said conveyer, as said conveyer moves through said cord feed position, thereby to bunch the cord into sections which are spaced apart in the direction of movement of the conveyer, means for feeding a liquid band-forming material to certain segments of at least certain of said cord sections, stationary means providing a liquid pool of said band forming material the surface of which is engaged by the coated segments of the cord sections to spread the band-forming material around the segmental surfaces thereof as said cord sections are moved away from said band material feeding means, and means for rolling said coated segments of said cord sections relative to said surface during engagement therebetween.

12. Apparatus for forming bands at predetermined intervals along a cord, comprising a continuous conveyer provided with spaced apart rows of cord holding elements, frame means supporting said conveyer for movement from a cord feed position through a band-forming position, shuttle means operated synchronously with said conveyer for weaving the cord back and forth between the spaced apart cord holding elements of said conveyer, as said conveyer moves through said cord feed position, thereby to bunch the cord into sections which are spaced apart in the direction of movement of the conveyer, means for feeding a liquid band-forming material to certain segments of at least certain of said cord sections, stationary means providing a liquid pool of said band-forming material the surface of which is engaged by the coated segments of the cord sections to spread the band-forming material around the segmental surfaces thereof as said cord sections are moved away from said band material feeding means, a shoe disposed to be engaged by said cord sections during engagement of the coated segments thereof with said surface, a belt cooperable with said shoe to grip the cord sections therebetween, and means operated in synchronism with said conveyer for driving said belt, thereby to rotate said coated segments of said cord sections relative to said surface during engagement therebetween.

13. The method of forming bands at predetermined intervals along a cord, which comprises bunching the cord into sections of substantially the same length while maintaining the sections separated, moving the sections through a coating zone, feeding a liquid band-forming material to predetermined surface segments of at least certain of said cord sections as said sections are moved through said zone, and rolling said certain segments of the cord sections to spread the band-forming material around the segmental surfaces thereof.

14. The method of producing cord lengths having bands at spaced intervals therealong, which comprises bunching a continuous cord into sections of substantially the same length while maintaining the sections separated, moving the sections successively through a coating zone and a drying zone to a cord take-off position, feeding a liquid band-forming material to predetermined surface segments of at least certain of said cord sections as said sections are moved through said coating zone, and cutting the cord into lengths as said cord sections are moved to said cord take-off zone.

15. The method of producing cord lengths having bands at spaced intervals therealong, which comprises bunching a continuous cord into sections of substantially the same length while maintaining the sections separated, moving the sections successively through a coating zone and a drying zone to a cord take-off position, feeding a liquid band-forming material to predetermined surface segments of at least certain of said cord sections as said sections are moved through said coating zone, rolling said certain segments of the cord sections to spread the band-forming material around the segmental surfaces thereof, and cutting the cord into lengths as said cord sections are moved to said cord take-off position.

EDGAR T. WARD.

REFERENCES CITED

The following references are of record in the file of this patent:

UNITED STATES PATENTS

| Number | Name | Date |
|---|---|---|
| 168,932 | Short | Oct. 9, 1875 |
| 687,754 | Horlacker | Dec. 3, 1901 |
| 817,313 | Gledhill | Apr. 10, 1906 |
| 840,353 | Lyford | Jan. 1, 1907 |
| 998,780 | Kelly | July 25, 1911 |
| 1,568,605 | Hough | Jan. 5, 1926 |
| 2,007,183 | Dickie et al. | July 9, 1935 |
| 2,366,944 | Veit | Jan. 9, 1945 |
| 2,382,057 | Hornstein | Aug. 14, 1945 |